United States Patent [19]

Zobel et al.

[11] Patent Number: 4,478,867
[45] Date of Patent: Oct. 23, 1984

[54] PROCESS FOR WHIPPING AN EMULSION

[75] Inventors: Frederick A. Zobel, Bedford Hills; Joseph D. Burke, Ossining, both of N.Y.; John T. Oppy, Allentown, N.J.

[73] Assignee: General Foods Corporation, White Plains, N.Y.

[21] Appl. No.: 477,293

[22] Filed: Mar. 21, 1983

[51] Int. Cl.$^3$ .................... A23C 13/12; A23C 13/14
[52] U.S. Cl. .................................. 426/570; 426/572; 426/565
[58] Field of Search ............... 426/564, 565, 570, 572, 426/564, 474

[56] References Cited

U.S. PATENT DOCUMENTS

| | | | |
|---|---|---|---|
| 3,431,117 | 3/1969 | Lorant | 426/565 |
| 3,889,001 | 6/1975 | Buide et al. | 426/565 |
| 4,144,293 | 3/1979 | Hamoto et al. | 261/93 |
| 4,251,560 | 2/1981 | Dell et al. | 426/570 |

*Primary Examiner*—Jeanette M. Hunter
*Attorney, Agent, or Firm*—J. T. Harcarik; T. R. Savoie; D. J. Donovan

[57] ABSTRACT

A process for whipping an homogenized emulsion comprised of fat, protein, emulsifier, stabilizer and water. The emulsion is aerated in a continuous mixer. The aerated emulsion is then pressure reduced in a gradual manner and whipped under pressure. The whipped emulsion is then reduced to atmospheric pressure wherein the temperature of the whipped emulsion upon reaching atmospheric pressure is from about 46° F. to 60° F.

18 Claims, No Drawings

PROCESS FOR WHIPPING AN EMULSION

BACKGROUND OF THE INVENTION

1. Field of the Invention

This invention relates to a process for whipping an emulsion and more particularly to a process for whipping an emulsion in a two stage continuous process wherein whipping temperatures and pressures are controlled.

2. Description of the Prior Art

Processes for preparing non-dairy whipped topping compositions from fats, proteins, emulsifier, stabilizers and water are described in U.S. Pat. No. 3,431,117. According to this patent, the above compositions are blended and homogenized at pressures of at least 6,000 psi then cooled, whipped and frozen. While these frozen whipped toppings have found wide spread acceptance, it has been desired to prepare these frozen whipped toppings in a more consistant manner employing increased throughput.

SUMMARY OF THE INVENTION

This invention pertains to a process for whipping an emulsion comprised of fat, protein, emulsifier, stabilizer and water. The emulsion is first aerated in a continuous mixer having a mixing pressure of from about 45 psig to about 100 psig and a mixing temperature of from about 30° F. to about 50° F. Next the aerated emulsion is pressure reduced in a gradual manner wherein the pressure is reduced from about a 10 psig reduction to about a 50 psig reduction. The pressure reduced aerated emulsion is then whipped at a whipping pressure of from about 20 psig to about 70 psig and at a whipping temperature of from about 30° F. to about 60° F. The whipped emulsion is then pressure reduced to atmospheric pressure wherein the temperature of the emulsion upon reaching atmospheric pressure is maintained at about 46° F. to about 60° F.

It has been found that when the present invention is employed the whipped product has a consistant overrun (volume of aerated and whipped emulsion to a volume of unaerated emulsion) and since the final whipping step occurs at pressure above atmospheric, the pressure above atmospheric may be employed to fill the whipped emulsions in containers at increased speeds allowing the increased throughput of the whipped emulsion process.

DETAILED DESCRIPTION OF THE INVENTION

Frozen whipped toppings, both dairy and non-dairy, are prepared from blends of fats, protein, emulsifier, stabilizer and water. Additionally carbohydrates, flavoring agents and colorants may be employed in the blend. A preferred range of ingredients for non-dairy whipped topping is as follows:

| Ingredients: | Percent by weight |
| --- | --- |
| Fats | 18.0 to 30.0 |
| Protein | 0.5 to 2.0 |
| Emulsifier | 0.4 to 2.0 |
| Stabilizer (gum) | 0.01 to 2.0 |
| Water | 40.0 to 60.0 |
| Carbohydrate (sugar) | 20.0 to 30.0 |
| Flavoring Agent | 0.1 to 2.0 |
| Coloring Agent | 0.01 to 0.05 |

A preferred range of ingredients for dairy whipped topping is as follows:

| Ingredients | Percent by weight |
| --- | --- |
| Milk Components | 2 to 30 |
| Fats | 18 to 30 |
| Protein | .5 to 2 |
| Emulsifier | .4 to 2 |
| Stabilizer (gum) | .01 to 2 |
| Water | 40 to 60 |
| Carbohydrate (sugar) | 20 to 30 |
| Flavoring Agent | 0.1 to 2 |
| Coloring Agent | .01 to .05 |

The blend is emulsified and homogenized at a pressure of at least 6,000 psi then cooled. Additional details are more fully set forth in the above mentioned U.S. Pat. No. 3,431,117 which is herein incorporated by reference.

According to the present invention the homogenized emulsion is aerated in a continuous mixer using conventional mixing methods. The mixing pressure is from about 45 psig to about 100 psig and the mixing temperature is from about 30° F. to about 50° F. Preferably the mixing pressure is from 50 psig to about 77 psig and the mixing temperature is from about 36° F. to about 43° F.

The emulsion is aerated by incorporating air or inert gases such as nitrogen or carbon dioxide into the emulsion while mixing. Sufficient air or inert gas is incorporated to produce a final whipped overrun of from 200% (1 cup=3 cups whip) to 350% (1 cup=4½ cups whip) and preferably of 250% (1 cup=3½ cups whip) to 300% (1 cup=4 cups whip) overrun.

Next the pressure of the aerated emulsion is reduced in a continuous manner wherein the pressure is reduced from about a 10 psig reduction to about a 50 psig reduction and preferably from 15 psig reduction to about 45 psig reduction. Means of reducing the pressure are conventional means such as conveying the emulsion through a tubing or pipe or series of tubings or pipes for a sufficient length and at a sufficient diameter to accomplish the said pressure reduction. The pressure reduced aerated emulsion is then whipped in a closed vessel. The whipping occurs at a whipping pressure of about 20 psig to about 70 psig and a temperature of about 30° F. to about 60° F. Preferably the whipping is done at a whipping pressure of about 20 psig to about 55 psig and at a temperature of about 43° F. to about 50° F. Suitably the whipping can be done in a scraped surface heat exchanger and suitably the product temperature is controlled by circulating refrigerant through the heat exchanger jacket.

Effective shearing of the emulsion must occur during the whipping in order to produce a suitable product having an overrun of 200% to 350% and preferably of 250% to 300%. If too little shear is employed a soupy product will occur and if too great a shear is employed then the product will appear to be hard and unacceptable. In order to determine the proper shear at a given throughput, pressure and temperature one merely increases or decreases the speed of rotation of the scraped surface heat exchanger as is readily apparent to one skilled in the art. The shear may be additionally altered by changing the blade configuration of the mixer, which is readily apparent to one skilled in the art. After the product has been whipped to the desired overrun, the pressure is then reduced to atmospheric pressure in a gradual manner. The pressure is reduced so that the final temperature of the whipped emulsion upon reaching atmospheric temperature is from about 46° F. to about 60° F. and preferably from about 48° F. to about 52° F. Pressure reducing the whipped emulsion to atmospheric pressure can be accomplished by using a restricted orfice such as a length of pipe wherein the diameter and length are controlled to produce the desired pressure drop and to produce the desired rate of pressure reduction.

As the pressure is being reduced in this step it may suitably go through a filler in order to be packaged. After the whipped emulsion is packaged it may be frozen and then sold to the consumer.

The following examples are presented to further illustrate the invention but it is to be understood that the invention is not limited to the details of these examples.

EXAMPLE 1

A non-dairy emulsion was prepared by blending the following composition: 25.5% hydrogenated vegetable oil (fat); 1.5% sodium caseinate (protein); 0.5% polysorbate 60, sorbitan monostearate (emulsifier); 0.1% xanthan gum, guar gum (stabilizer); 27% sugar; 45.3% water (all % by weight) and the remainder; natural and artificial vanilla flavoring and coloring agents. The blend was homogenized at 8000 psig, cooled to 40° F. and allowed to crystallize. This homogenized emulsion was fed at a rate of 100 pounds per minute to a 16 inch diameter continuous mixer. Air was incorporated into the emulsion in sufficient quantity so that the final product had a 300% overrun. The mixing pressure was 66 psig, the temperature range of mixing was 40°-43° F. and the mixer operated at a mixing speed of 400 rpm. The aerated emulsion was transferred to a series of (two) scraped surface heat exchangers by employing a one inch diameter braided tygon tubing 24 feet long. This tubing accomplished a pressure reduction of 26 psig. The 2 scraped surface heat exchangers employed were each 6 inch diameter×4 feet long, and with 4 bladed, 2 inch diameter rotors (Contherm, Alfa-Laval). The scraped surface heat exchangers operated at an inlet pressure of 44 psig and outlet pressure of 36 psig, mixing speeds of 670 rpm and an inlet temperature of 43° F. and an outlet temperature of 48° F. Upon exiting the scraped surface heat exchanger the pressure of the whipped emulsion was reduced to atmospheric pressure by discharging the whipped emulsion through a 1 inch diameter×15 feet long tygon tube. The final aerated whipped×emulsion had a temperature of 50° F. The product was put in containers and frozen to a temperature of 0° F. The stability of this thawed whipped composition was judged by a panel of experts to have acceptable flavor, texture, and percent overrun after 14 days storage at refrigerated temperatures.

Furthermore, the amount of overrun of the product was found to be consistant from container to container.

EXAMPLE 2

In this example a non-dairy emulsion as above was employed except that the throughput was 25 pounds per minute. The mixing pressure of the first 6 inch diameter continuous mixer was 72 psig, the temperature range was 40° F. to 44° F. and the mixing speed was 750 rpm. The pressure was then reduced 40 psig by employing 18 feet of ⅜ inch diameter braided tygon tubing. The product was then whipped in a single scraped surface heat exchanger as described above at an inlet pressure of 34 psig and an outlet pressure of 30 psig, mixing speed of 600 rpm and over a temperature range of b 44°-48° F. The product was then discharged to atmospheric pressure employing 15 feet of 1 inch diameter tygon tubing and the final emulsion had a temperature of 50° F. As described in Example 1 an acceptable product was formed.

EXAMPLE 3

A dairy emulsion was prepared by blending the following composition: 2.2% non-fat dry milk; 25.5% hydrogenated vegetable oil (fat); 1.5% sodium caseinate (protein); 0.5% polysorbate 60, sorbitan monostearate (emulsifier); 0.1% xanthan gum, guar gum (stabilizer); 23.5% carbohydrates; 46.9% water (all % by weight) and the remainder; natural and artificial flavoring and coloring agents. The blend was homogenized at 8000 psig, cooled to 40° F. and allowed to crystallize. This homogenized emulsion was fed at a rate of 18 pounds per minute to a 6″ inch diameter continuous mixer. Air was incorporated into the emulsion in sufficient quantity so that the final product had a 270% overrun. The mixing pressure was 73 psig, the temperature range of mixing was 40° F. to 46° F. and the mixer operated at a mixing speed of 750 rpm. The aerated emulsion was transferred to a single scraped surface heat exchange by employing a ⅜ inch diameter braided tygon tubing 18 feet long. This tubing accomplished a pressure reduction of 18 psig. The scraped surface heat exchanger employed was 6 inch diameter×4 feet long, and with 4 bladed, 2 inch diameter rotor (Contherm, Alfa-Laval). The scraped surface heat exchanger operated at an inlet pressure of 55 psig and outlet pressure of 50 psig, mixing speeds of 750 rpm and an inlet temperature of 46° F. and an outlet temperature of 52° F. Upon exiting the scraped surface heat exchanger the pressure of the whipped emulsion was reduced to atmospheric pressure by discharging the whipped emulsion through a ⅜ inch diameter×15 foot long tygon tube. The final aerated whipped emulsion had a temperature of 52° F. The product was put in containers and frozen to a temperature of 0° F. The stability of this thawed whipped composition was judged by a panel of experts to have acceptable flavor, texture, and percent overrun after 14 days storage at refrigerated temperatures.

Furthermore, the amount of overrun of the product was found to be consistant from container to container.

We claim:

1. A process for whipping an homogenized emulsion comprised of fat, protein, emulsifier, stabilizer and water which process comprises:
   (a) incorporating gas into said emulsion in a continuous mixer having a mixing pressure of about 45 psig to about 100 psig and a mixing temperature of from about 30° F. to about 50° F.;
   (b) pressure reducing said aerated emulsion wherein the pressure is reduced from about a 10 psig reduction to about a 50 psig reduction in a gradual manner;
   (c) whipping said pressure reduced gas incorporated aerated emulsion at a whipping pressure of from about 20 psig to about 70 psig and at a temperature of from about 30° F. to about 60° F.; and (d) pressure reducing said whipped emulsion to an atmospheric pressure wherein the temperature of the whipped emulsion upon reaching atmospheric pressure is from about 46° F. to about 60° F.

2. A process according to claim 1 wherein the gas incorporation of said emulsion is at a mixing pressure of about 50 psig to about 77 psig.

3. A process according to claim 1 wherein the gas incorporation of said emulsion occurs at a temperature of from about 36° F. to 43° F.

4. A process according to claim 1 wherein said pressure reduction of said gas incorporated emulsion is from about a 15 psig reduction to about a 45 psig reduction.

5. A process according to claim 1 wherein said whipping of the pressure reduced gas incorporated emulsion is at a whipping pressure of from about 20 psig to about 55 psig.

6. A process according to claim 1 wherein the whipping of said pressure reduced gas incorporated emulsion is at a whipping temperature of about 43° F. to about 50° F.

7. A process according to claim 1 wherein the pressure reduction of said whipped emulsion to atmospheric pressure is at a temperature of from about 48° F. to about 52° F.

8. A process according to claim 1 wherein the whipping of said gas incorporated emulsion is to an overrun of 200% to 350%.

9. A process according to claim 8 wherein the whipping of said gas incorporated emulsion is to an overrun of about 250% to 300%.

10. A process according to claim 1 wherein the emulsion further comprises carbohydrate.

11. A process according to claim 10 wherein the fat is from 18 to 30% by weight, the protein is from 0.5 to 2% by weight, the emulsifier is from 0.4 to 2% by weight, the stabilizer is from 0.01 to 2% by weight, the water is from 40 to 60% by weight, and the carbohydrate is from 20 to 30% by weight.

12. A process according to claim 11 wherein the carbohydrate is sugar.

13. A process according to claim 10 wherein the emulsion further comprises a flavoring agent.

14. A process according to claim 13 wherein the flavoring agent is 0.1 to 2% by weight.

15. A process according to claim 1 wherein the pressure reduced gas incorporated emulsion is whipped in a scraped surface heat exchanger.

16. A process according to claim 1 wherein the pressure reduced gas incorporated emulsion is whipped employing effective shear.

17. A process according to claim 1 wherein the emulsion further comprises a milk component.

18. A process according to claim 17 wherein the milk component is from 2 to 30% by weight.

* * * * *